(12) United States Patent
Koga et al.

(10) Patent No.: US 8,128,051 B2
(45) Date of Patent: Mar. 6, 2012

(54) SEAT SLIDING APPARATUS FOR VEHICLE

(75) Inventors: Yoshitaka Koga, Chiryu (JP); Jueru Shimizu, Handa (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 248 days.

(21) Appl. No.: 12/543,010

(22) Filed: Aug. 18, 2009

(65) Prior Publication Data

US 2010/0051776 A1 Mar. 4, 2010

(30) Foreign Application Priority Data

Aug. 26, 2008 (JP) .................................. 2008-217214

(51) Int. Cl.
*A45D 19/04* (2006.01)

(52) U.S. Cl. ..................... 248/429; 248/430; 296/65.13; 296/65.15; 297/344.1

(58) Field of Classification Search .................. 248/429, 248/430; 296/65.14, 65.15; 297/344.1
See application file for complete search history.

(56) References Cited

U.S. PATENT DOCUMENTS 5,014,958 A * 5/1991 Harney .......................... 248/394

(Continued)

FOREIGN PATENT DOCUMENTS

JP 9-118155 5/1997

OTHER PUBLICATIONS

U.S. Appl. No. 12/732,621, filed Mar. 26, 2010, Koga et al.

*Primary Examiner* — Terrell McKinnon
*Assistant Examiner* — Daniel J Breslin
(74) *Attorney, Agent, or Firm* — Oblon, Spivak, McClelland, Maier & Neustadt, L.L.P.

(57) ABSTRACT

A seat sliding apparatus for a vehicle includes lower rails, upper rails, screw mechanisms provided between the upper rails and the lower rails, the screw mechanism including a screw shaft and a nut which is engaged with the screw shaft, one of the screw shaft and the nut being mounted to the upper rail so as to rotate, the other of the screw shaft and the nut being fixedly mounted to the lower rail, and a slide driving mechanism including a driving motor, a transmission mechanism for transmitting a rotational force outputted from the driving motor to one of the screw shaft and the nut so as to rotate, a bracket having the driving motor and the transmission mechanism mounted thereon and connecting the upper rails, and a protection cover attached to the bracket for covering at least lower and bottom sides of the driving motor and the transmission mechanism.

15 Claims, 6 Drawing Sheets

U.S. PATENT DOCUMENTS

| | | | |
|---|---|---|---|
| 5,048,886 A * | 9/1991 | Ito et al. | 296/65.14 |
| 5,150,872 A * | 9/1992 | Isomura | 248/429 |
| 6,010,804 A * | 1/2000 | Barksdale | 429/178 |
| 6,260,922 B1 * | 7/2001 | Frohnhaus et al. | 297/330 |
| 6,959,900 B2 * | 11/2005 | Hoshihara et al. | 248/429 |
| 6,971,620 B2 * | 12/2005 | Moradell et al. | 248/422 |
| 7,143,513 B2 * | 12/2006 | Taubmann et al. | 29/893.1 |
| 7,810,780 B2 * | 10/2010 | Koga et al. | 248/430 |
| 2003/0168566 A1 * | 9/2003 | Ito et al. | 248/429 |
| 2004/0164601 A1 * | 8/2004 | Wang | 297/344.2 |
| 2004/0184245 A1 * | 9/2004 | Yokote et al. | 361/752 |
| 2007/0051047 A1 * | 3/2007 | Taubmann et al. | 49/348 |
| 2007/0108859 A1 * | 5/2007 | Stack et al. | 310/112 |
| 2008/0163708 A1 * | 7/2008 | Porinsky et al. | 74/89.14 |
| 2008/0238126 A1 | 10/2008 | Koga et al. | |
| 2008/0238167 A1 * | 10/2008 | Koga et al. | 297/344.1 |
| 2009/0272869 A1 * | 11/2009 | Beneker et al. | 248/429 |

\* cited by examiner

SEAT SLIDING APPARATUS FOR VEHICLE

CROSS REFERENCE TO RELATED APPLICATIONS

This application is based on and claims priority under 35 U.S.C. §119 to Japanese Patent Application 2008-217214, filed on Aug. 26, 2008, the entire content of which is incorporated herein by reference.

FIELD OF THE INVENTION

The present invention relates to a seat sliding apparatus for a vehicle.

BACKGROUND

A known seat sliding apparatus for a vehicle is disclosed in JPH09-118155A. According to the disclosure in JPH09-118155A, the known seat sliding apparatus includes a pair of lower rails provided at the right and left of the seat sliding apparatus, respectively, and fixed to a vehicle floor, and a pair of upper rails slidably supported by the lower rails, respectively, and supporting a vehicle seat. Each of the lower rails retains a screw shaft which extends in a front-rear direction of the vehicle so that the screw shaft is rotatable. Each of the upper rails fixedly retains a nut member which is threaded onto the screw shaft. A slide drive portion, which includes a driving motor and a transmission mechanism for rotating the screw shaft, is provided at the lower rails. The driving motor and the transmission mechanism are fixed to an inner surface of a bottom wall of a front frame which is fixed on between the lower rails and which is formed in a U-shape in cross-section. The driving motor and the transmission mechanism cooperate to actuate each of the screws which are individually retained by the respective lower rails. Upon the actuation of the screw shaft by the slide drive portion to rotate, the nut member is relatively displaced in an axial direction, and thus the upper rail slides in a front-rear direction of the vehicle relative to the lower rail. By means of this sliding movement of the upper rails, the position of the vehicle seat which is supported by the upper rails is adjusted in the front-rear direction of the vehicle.

Generally, the vehicle seat is configured to be adjustable not only in a front-rear direction but also in an upward and downward direction. In those circumstances, one of a screw shaft and a nut member is rotatably supported by each of upper rails provided laterally spaced from each other at the right and left sides as a pair, the nut member or the screw shaft which is engaged with the screw shaft or the nut member rotatably supported by each of the upper rails is supported by a lower rail so as not to rotate, and the screw shafts or the nut members rotatably supported by the respective upper rails are driven by a slide drive portion, which includes a drive motor and a transmission mechanism and is fixed between the upper rails, to rotate.

Further, a level of a stroke for a height adjustment of a mechanism for lifting or lowering a seat tends to increase. In a case where the vehicle seat is adjusted to be in a higher position, the slide drive portion provided under the seat is likely to be seen from a front. This necessitates considering ameliorating an appearance of the slide drive portion. Further, because it is possible that an occupant reaches the slide drive portion when he/she gropes under the seat, it is likable to consider the safety of the occupant when using the seat apparatus. As counter measurements for the foregoing drawbacks, an edge portion of an end surface of a long bracket to which parts of the slide drive portion are assembled is bent upward or a bent portion is additionally provided to the end surface in known constructions. However, the known counter measurements are not sufficient and rather increases a manufacturing cost and causes another drawback regarding restrictions for formability of the bracket.

Further, a wire for supplying electric power to the driving motor of the slide drive portion is arranged through and/or under the seat. And according to known structures, a separate bracket particularly for retaining a wire harness and a connector, or the like, is provided in the vicinity of a sliding apparatus. However, according to the above-explained known structures, a structure provided under the seat is complicated and a manufacturing cost is increased because of an increase of the number of parts and an increase in assembling time, thus an improvement in this regard is desired.

A need thus exists for a seat sliding apparatus for a vehicle which is not susceptible to the drawback mentioned above.

SUMMARY OF THE INVENTION

In light of the foregoing, the present invention provides a seat sliding apparatus for a vehicle, which includes first and second lower rails laterally spaced and adapted to be fixed to a vehicle floor, first and second upper rails laterally spaced and adapted to support a seat, the first and second upper rails being slidably supported by the first and second lower rails, respectively, a first screw mechanism provided between the first upper rail and the first lower rail, the first screw mechanism including a first screw shaft and a first nut which is engaged with the first screw shaft by means of threaded portions, one of the first screw shaft and the first nut being mounted to the first upper rail so as to rotate, the other of the first screw shaft and the first nut being fixedly mounted to the first lower rail, a second screw mechanism provided between the second upper rail and the second lower rail, the second screw mechanism including a second screw shaft and a second nut which is engaged with the second screw shaft by means of threaded portions, one of the second screw shaft and the second nut being mounted to the second upper rail so as to rotate, the other of the second screw shaft and the second nut being fixedly mounted to the second lower rail, and a slide driving mechanism including (a) a driving motor, (b) a transmission mechanism for transmitting a rotational force outputted from the driving motor to one of the first screw shaft and the first nut being mounted to the first upper rail so as to rotate and to one of the second screw shaft and the second nut being mounted to the second upper rail so as to rotate, (c) a bracket having the driving motor and the transmission mechanism mounted thereon and connecting the first and second upper rails, and (d) a protection cover attached to the bracket for covering at least lower and bottom sides of the driving motor and the transmission mechanism.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Embodiments of the present invention will be explained with reference to illustrations of drawing figures as follows. Orientations of front, rear, right, left, upper (top), lower (bottom) in the embodiments correspond to orientations of a vehicle.

Figure 1:
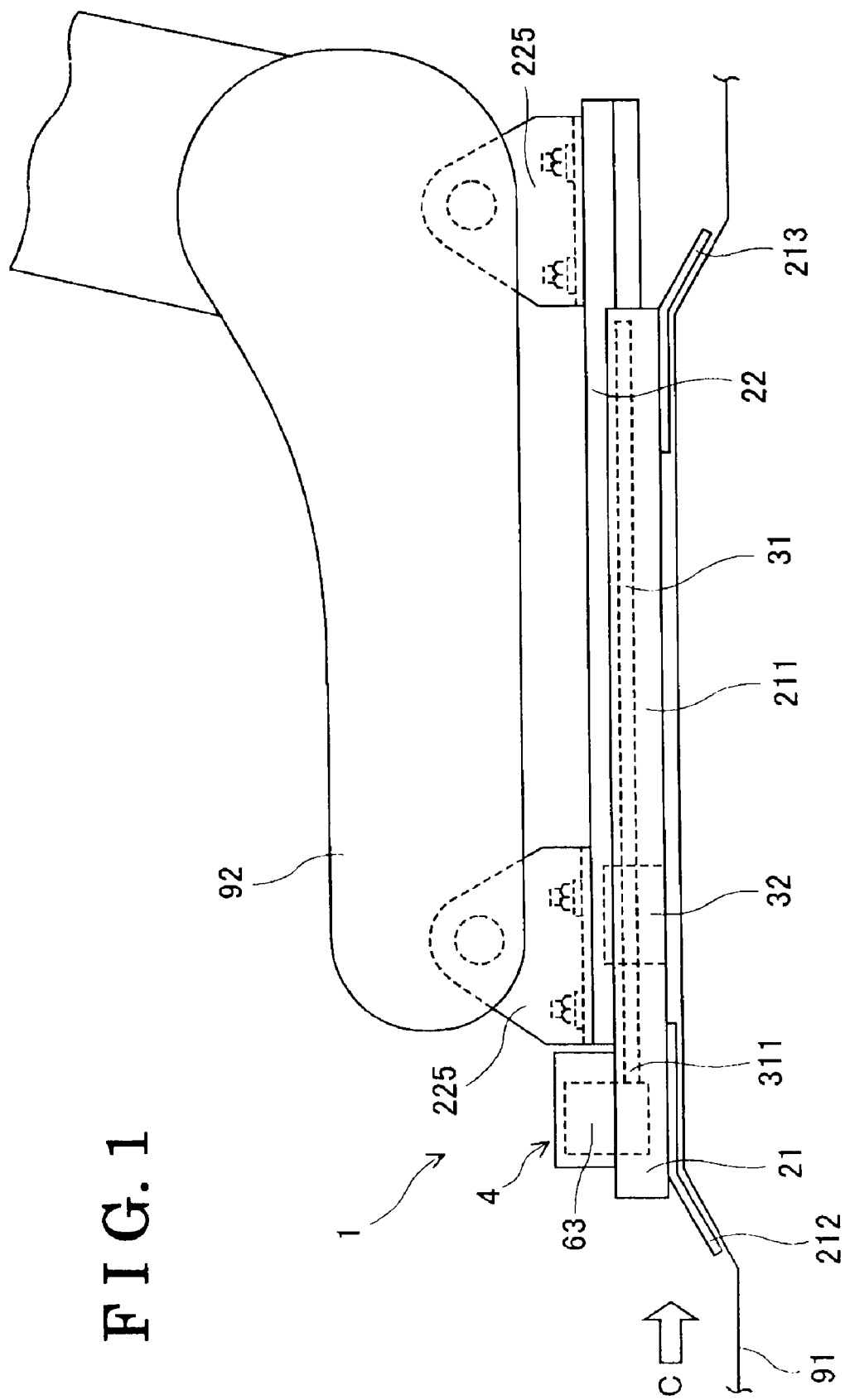
FIG. 1 is a lateral view for explaining overall constructions of a seat sliding apparatus for a vehicle according to a first embodiment of the present invention.

As shown in FIG. 1, a sliding apparatus 1 includes lower rails (first and second lower rails) 21, 21, upper rails (first and second upper rails) 22, 22, rotatable screw shafts (first and second screw shafts) 31, 31, unrotatable nut members (first and second nuts) 32, 32, and a slide drive portion (slide driving mechanism) 4. The sliding apparatus 1 is provided on a vehicle floor 91 and supports a vehicle seat (seat) 92 so as to be slidable in a front-rear direction. The lower rails 21, 21, the upper rails 22, 22, the screw shafts 31, 31, and the nut members 32, 32 are provided on the right and left sides as pairs, respectively, to be laterally spaced and to be in parallel to each other.

Figure 2:
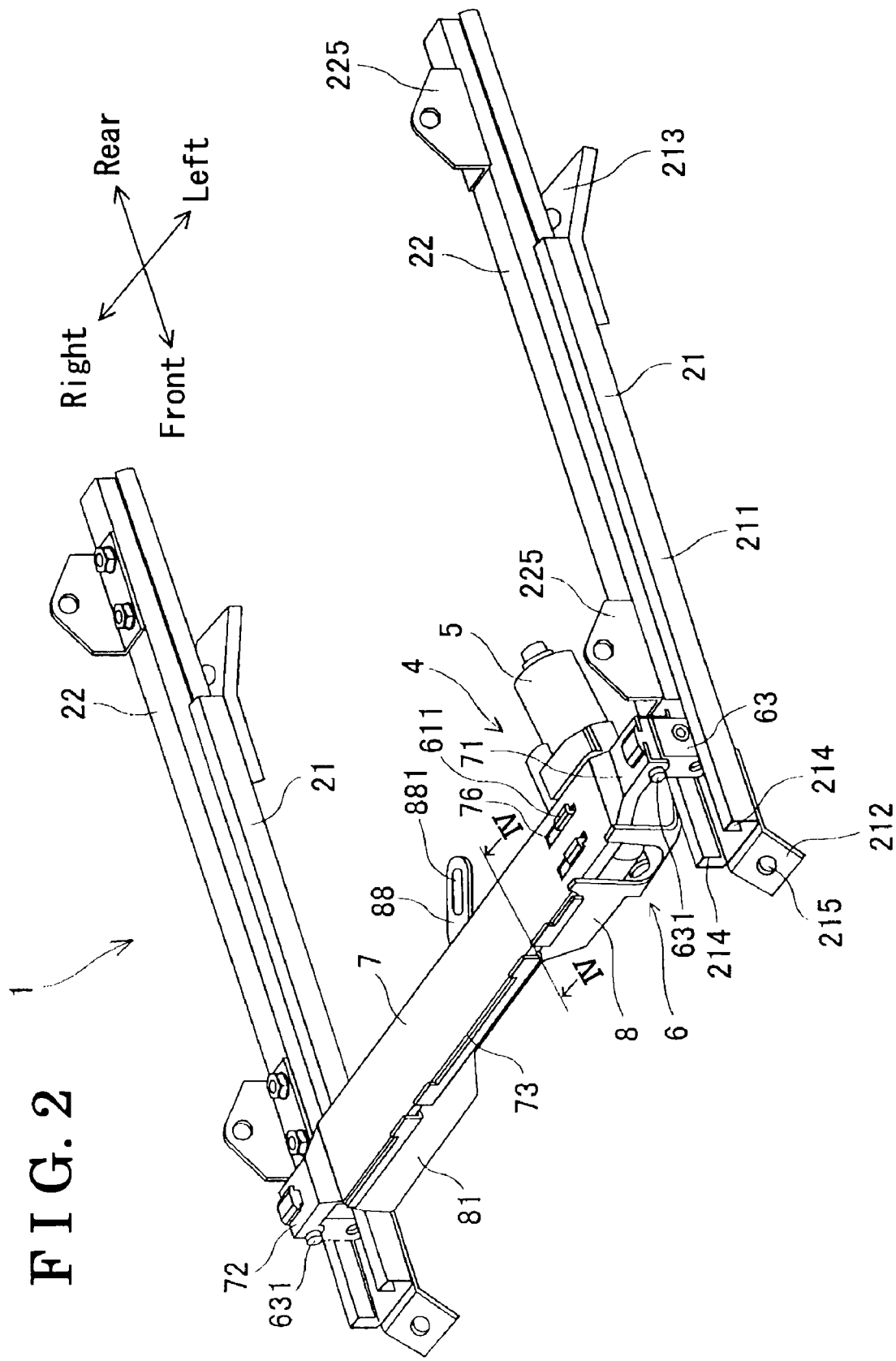
FIG. 2 is a perspective view for explaining detailed constructions the seat sliding apparatus for the vehicle shown in FIG. 1.
Figure 3:
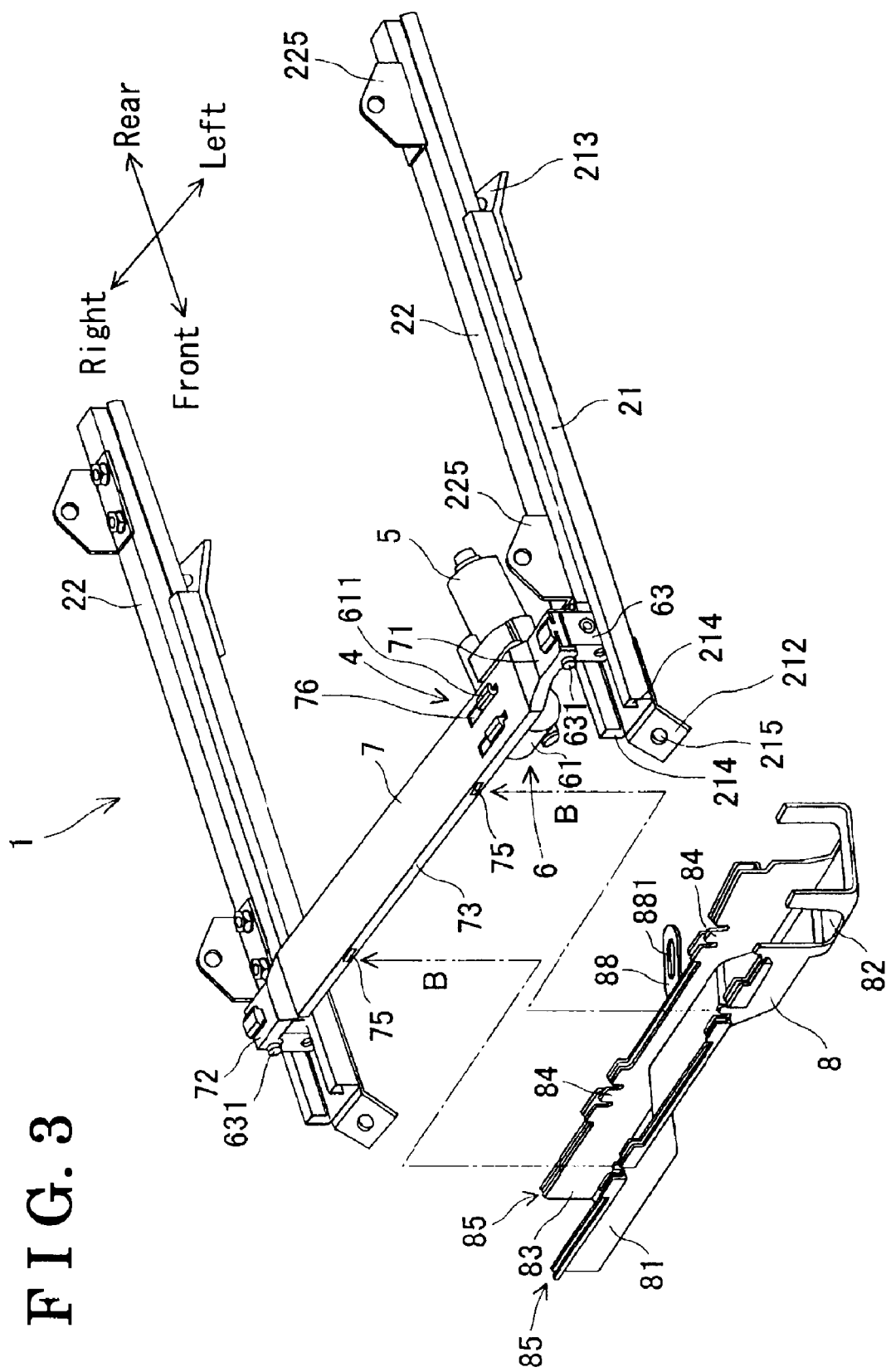
FIG. 3 is a perspective view of the seat sliding apparatus for the vehicle shown in FIG. 1, the perspective view showing a state where a protection cover is unassembled.

The lower rail 21 includes a rail main portion 211 extending in the front-rear direction, a front fixing portion 212 extending in a forward-downward direction from a front-bottom end of the rail main portion 211, and a rear fixing portion 213 extending in a rearward-downward direction from a rear-bottom end of the rail main portion 211. The lower rails 21, 21 are provided in parallel to each other as a pair on the right and left to extend in the front-rear direction. As shown in FIGS. 2 and 3, the rail main portion 211 is formed to have a substantially U-shaped cross section in which an upper portion is open. Each of top ends of walls of the rail main portion 211 is bent in an inward direction, and further bent in a downward direction to form a slide engaging portion 214 having a long groove. Each of the front fixing portion 212 and the rear fixing portion 213 is formed with an attachment hole 215 so that the front fixing portion 212 and the rear fixing portion 213 are fixed to the vehicle floor 91 by means of rivets, respectively, which are provided through the attachments holes 215.

The upper rail 22 is made from a long rail member and is provided over each of the lower rails 21 to be in parallel to the lower rail 21. The upper rail 22 is formed to have a substantially inverted U-shape in a cross section where a bottom side is open. Each of bottom ends of walls of the upper rails 22 is bent outwardly and further bent in an upward direction to form a slide engaging portion having a long groove. The slide engaging portion of the upper rail 22 is engaged with the slide engaging portion 214 of the lower rail 21 via a rotational member, and allows a sliding movement of the upper rail 22 in the front-rear direction as well as restricting a relative movement of the upper rail 22 in an upper-lower direction and in a right-left direction. A bracket 225 formed in a substantially L-shape in cross-section is fixed on a top surface of the upper rail 22 at a front portion and a rear portion thereof by means of a screw, respectively. Thus, according to this embodiment, two brackets 225 are provided on the top surface of each of the upper rails 22, and four brackets 225 in total are attached to a cushion frame of the vehicle seat 92.

The screw shaft 31 is formed with a long member on which a male screw is threaded. The screw shaft 31 is provided inside each of the upper rails 22 to be rotatable and to be axially unmovable. The screw shafts 31, 31 are arranged in parallel to each other on the right side and the left side as a pair. A front end 311 of the screw shaft 31 is connected to a direction changing reduction gear portion 63 so that the screw shaft 31 is actuated to rotate.

The nut member 32 is formed with a member on which a female screw to be engaged with the screw shaft 31 is threaded. The nut member 32 is positioned inside each of the lower rails 21, 21 at a front portion thereof to be fixedly supported so as not to rotate. The nut members 32, 32 are arranged on the right side and the left side as a pair.

As shown in FIGS. 2 and 3, the slide drive portion 4 includes a drive motor (driving motor) 5, a transmission mechanism 6, a long bracket (bracket) 7, and a protection cover 8 made of resin.

Figure 4:
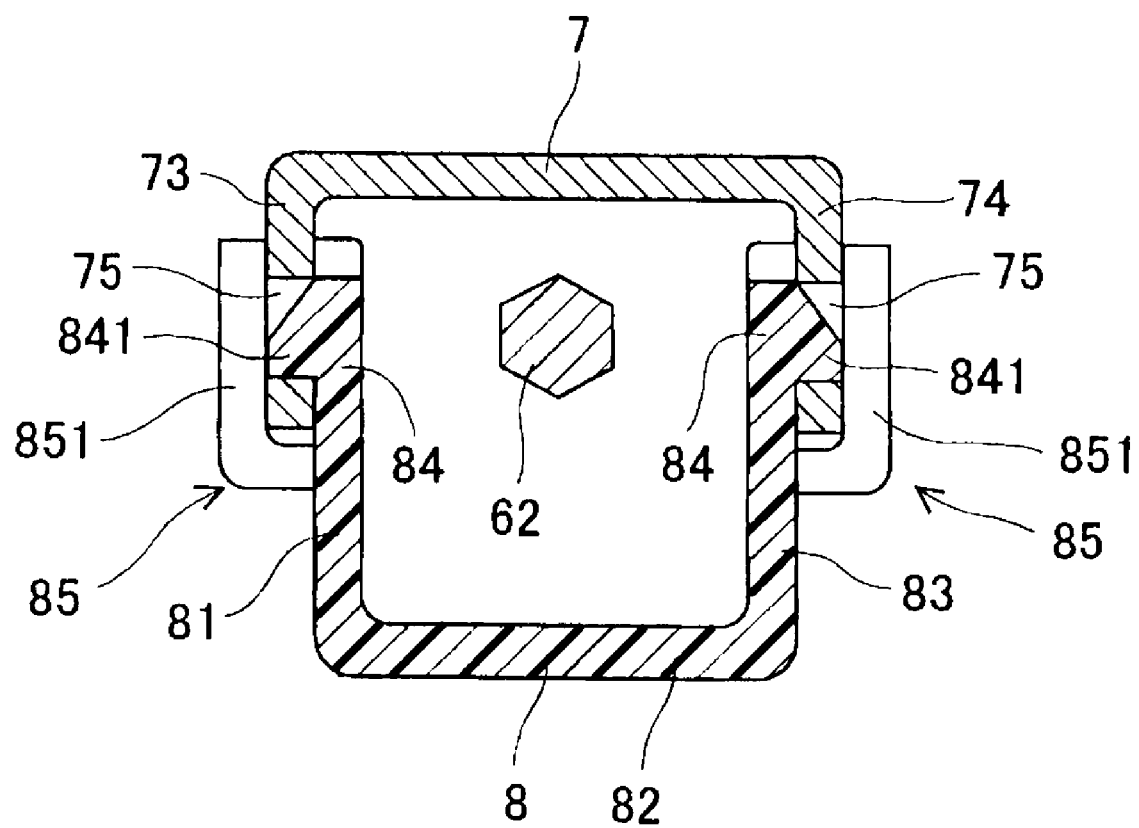
FIG. 4 is a cross-sectional view of a slide drive portion taken on line IV-IV in FIG. 2.

The long bracket 7 is formed with a substantially rectangular shaped member whose longitudinal side is arranged in a right-left direction of the vehicle. A first end (left end) 71 and a second end (right end) 72 of the long bracket 7 are positioned on the top surface of the upper rails 22, 22 respectively, at front-end portions thereof. In other words, the long bracket 7 is provided to connect the upper rails 22, 22 arranged laterally spaced away from each other on the right and left sides. A front end and a rear end of the long bracket 7 are bent in a downward direction to form side flanges, 73, 74, respectively. That is, as shown in FIG. 4, the long bracket 7 is formed to have an inverted U-shape in a longitudinal cross-section where a bottom side of the long bracket 7 is open. Engagement hole portions 75, 75 are formed on each of the side flanges 73, 74 at portions closer to the left end and the right end relative to the center, respectively. Thus, four engagement hole portions in total are provided on the long bracket 7.

The drive motor 5 is positioned on a bottom-rear side of the long bracket 7 at a portion closer to the left end of the long bracket 7. The drive motor 5 is integrally retained with a reduction gear portion 61. The drive motor 5 has an output capacity which generates sufficient driving force to move the vehicle seat 92 to slide.

As shown in FIGS. 3 and 4, the transmission mechanism 6 which transmits the driving force from the drive motor 5 to each of the screw shafts 31, 31 includes the reduction gear portion 61, a connecting shaft 62, and the direction changing reduction gear portion 63. The driving force from the drive motor 5 is transmitted to the screw shafts 31, 31 via the reduction gear portion 61, the connecting shaft 62, and the direction changing reduction gear portion 63 in the above-mentioned order. The reduction gear portion 61 includes a housing and hook portions 611 provided on a top surface of the housing. The hook portions 611 are retained at attachment holes 76, respectively, formed penetrating the long bracket 7. The reduction gear portion 61 further retains the drive motor 5. An output shaft of the drive motor 5 is connected to the reduction gear portion 61, and the driving force of the drive motor 5 is decelerated by means of a built-in worm gear mechanism and the decelerated driving force is outputted to the connecting shaft 62. The connecting shaft 62 is retained penetrating through the reduction gear portion 61 so that an axis of the connecting shaft 62 extends in the right-left direction. The connecting shaft 62 is a shaft member having, for example, a hexagonal shape in a cross-section and a length which approximately reaches the upper rails 22, 22. Further, the connecting shaft 62 is rotationally connected to a worm wheel of the worm gear mechanism to distribute the decelerated driving force to each of the screw shafts 31, 31. The direction changing reduction gear portion 63 is provided at a front end of each of the upper rails 22, and the connecting shaft 62 and the screw shaft 31 are rotationally connected to the direction changing reduction gear portion 63. The direction changing reduction gear portion 63 is configured to decelerate the driving force of the connecting shaft 62 by means of a built-in gear mechanism and to rotationally drive the screw shaft 31 by changing directions to transmit the driving force by ninety degrees. The first end 71 and the second end 72 of the long bracket 7 are fixed to respective top sides of the direction changing reduction gear portion 63 by means of a screw 631. Thus, the first and second ends of the long bracket 7 are fixed to the upper rails 22, 22 respectively.

As shown in FIG. 3, the protection cover 8 is formed to have a longer length in the right-left direction and a shorter width in a front-rear direction. The protection cover 8 is positioned under the long bracket 7 to cover a front portion of the drive motor 5, the gear reduction portion 61 of the transmission mechanism 6, and the connecting shaft 62. As shown in FIG. 4, the protection cover 8 is formed to have a U-shape in a cross-section where an upper side of the protection cover 8 is open, and includes a front wall 81, a bottom wall 82, and a rear wall 83 which are integrally formed. The bottom wall 82 of the protection cover 8 is structured so as to have different height levels (i.e., the depth of U-shaped cross-section). More particularly, the protection cover 8 is structured so that the depth of the U-shaped cross section assumes to be shallower at a center in a longitudinal direction, to be deeper at end portions of the protection cover 8 on the right and left sides, and to be the deepest at the portion provided facing the reduction gear portion 61 which is positioned further to the left. Further, a portion of the rear wall 83 which is close to the drive motor 5 and a portion of the front wall 81 which is close to the reduction gear portion 61 are partially recessed so that the rear wall 83 and the front wall 81 do not interfere with the drive motor 5 and the reduction gear portion 61, respectively.

An engaging detent portion 84 is provided on an upper rim of the front wall 81 and an upper rim of the rear wall 83 of the protection cover 8 at left and right portions which face the engagement hole portions 75 of the side flanges 73, 74 of the long bracket 7. Thus, according to this embodiment, four engaging detent portions 84 are formed on the protection cover 8. The engaging detent portions 84 are formed by notching the upper rims of the front wall 81 and the rear wall 83 so as to be partially elastically deformable. Further, as shown in FIG. 4, an engagement projection 841 is provided on an outer side of the engaging detent portion 84. A guide portion 85 for sandwiching the side flanges 73, 74 of the long bracket 7 is provided on the upper rims of the front wall 81 and the rear wall 83 avoiding the engaging detent portions 84. The guide portion 85 includes guide members 851 which are formed by extending the rims of the front wall 81 and the rear wall 83 in horizontal directions and further bending in upward directions so as to be in parallel to the front wall 81 and the rear wall 83. According to the embodiment, a distance between the guide member 851 and each of the front wall 81 and the rear wall 83, that is, a width of a clearance of the guide portion 85 is determined to be approximately the same or to be slightly greater than a thickness of the side flanges 73, 74 of the long bracket 7.

Further, a harness retaining portion 88 is provided on a substantially bottom center portion of the rear wall 83 of the protection cover 8 to extend in a rearward direction. The harness retaining portion 88 is formed in a plate shape having a narrow width, and an ellipse retaining hole 881 is formed on the harness retaining portion 88. The retaining hole 881 is configured so that, for example, a wire harness which includes a bundle of power lines of the drive motor 5, or the like, is retained thereto or, for example, a connector which connects a power line, or the like, to a subject is fixed thereto. Positioning of the harness retaining portion 88 and a configuration of the retaining hole 881 can be designed in accordance with a positioning or configuration of a wire harness or a connector, or the like.

A method for attaching and detaching the protection cover 8 of the sliding apparatus 1 according to the embodiment will be explained as follows. As indicated with arrowed dotted lines B, B in FIG. 3, when assembling the protection cover 8, the protection cover 8 is attached from underneath of the long bracket 7 so that the guide portion 85 of the protection cover 8 sandwiches the side flanges 73, 74 of the long bracket 7. In those circumstances, the engaging detent portion 84 is guided to a portion positioned bellow the engagement hole portion 75, and thus the positioning for attaching the protection cover 8 to the long bracket 7 by means of the engaging detent portion 84 and the engagement hole portion 75 is readily determined. Thereafter, by pushing the protection cover 8 from the bottom in an upward direction, each of the engagement projections 841 of the engaging detent portion 84 comes in contact with a bottom end of the side flange 73, 74, and the engaging detent portion 84 is elastically deformed to curve inward to slide on an inner side of the side flange 73, 74 in an upward direction. When the engaging detent portion 84 reaches a height of the engagement hole portion 75, each of the engagement projections 841 comes to fit into the corresponding engagement hole portion 75. In those circumstances, the engaging detent portion 84 returns from the deformed state to the original state to configure an attached state shown in FIG. 4. As shown in FIG. 4, thus, the long bracket 7 and the protection cover 8 cover the connecting shaft 62.

In case of removing the protection cover 8 from the long bracket 7, by simultaneously pushing the engagement projections 841 positioned on the front and rear inwardly in the attached state shown in FIG. 4, the engaging detent portions 84 and the engagement hole portions 75 are disengaged. In those circumstances, by pulling the protection cover 8 downward, the protection cover 8 can be detached from the long bracket 7. As explained above, the protection cover 8 is readily attached to or detached from the long bracket 7 according to the construction of the embodiment.

Figure 6:
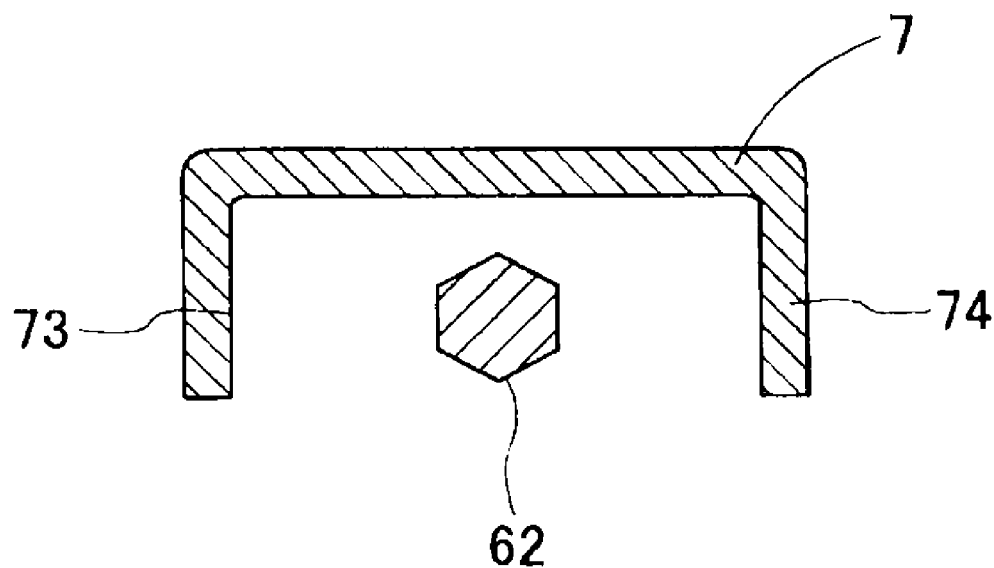
FIG. 6 is a cross-sectional view of a slide drive portion according to a known seat slide apparatus.

According to the construction of the embodiment, as indicated with an arrow C shown in FIG. 1, when viewing the vehicle seat 92 from the front, the drive motor 5 and the connecting shaft 62 are not seen, and an external surface of the protection cover 8 is seen. Further, edge portions of bottom ends of the side flanges 73, 74 of the long bracket 7 are housed in the guide portion 85 of the protection cover 8. Accordingly, even if an occupant places his/her hand under the vehicle seat 92, with the construction of the embodiment, the occupant only reaches the protection cover 8 and does not come in a direct contact with the drive motor 5, the connecting shaft 62, and the edge portions of the side flanges 73, 74. On the other hand, as shown in a cross-sectional view of a slide actuating portion in FIG. 6, a known sliding apparatus does not include the protection cover 8 and a bottom of the long bracket 7 is open. Thus, with the construction of the known sliding apparatus, the drive motor 5, the connecting shaft 62, and other transmission members are seen when viewing from the front, which deteriorates an appearance. Further, in a case where an occupant places his/her hand under the vehicle seat, according to the construction of the known sliding apparatus, it is possible that the occupant comes in contact with a drive motor and a connecting shaft which are in operation, and edge portions of the side flanges. With the construction of the sliding apparatus 1 for the vehicle seat according to the embodiment, an appearance is ameliorated and the reduction gear portion 61, the connecting shaft 62, and the edge portions of the side flanges 73, 74 are blocked from the outside.

Further, according to the embodiment, because a wire harness or a connector, or the like, can be attached to or fixed to the retaining hole 881 of the harness retaining portion 88 of the protection cover 8, a bracket particularly for retaining the wire harness is not necessary. Thus, a structure provided under the vehicle seat 92 is simplified, and an increase in the number of parts and an assembling time is restrained to contribute to reduce a manufacturing cost.

Figure 5:
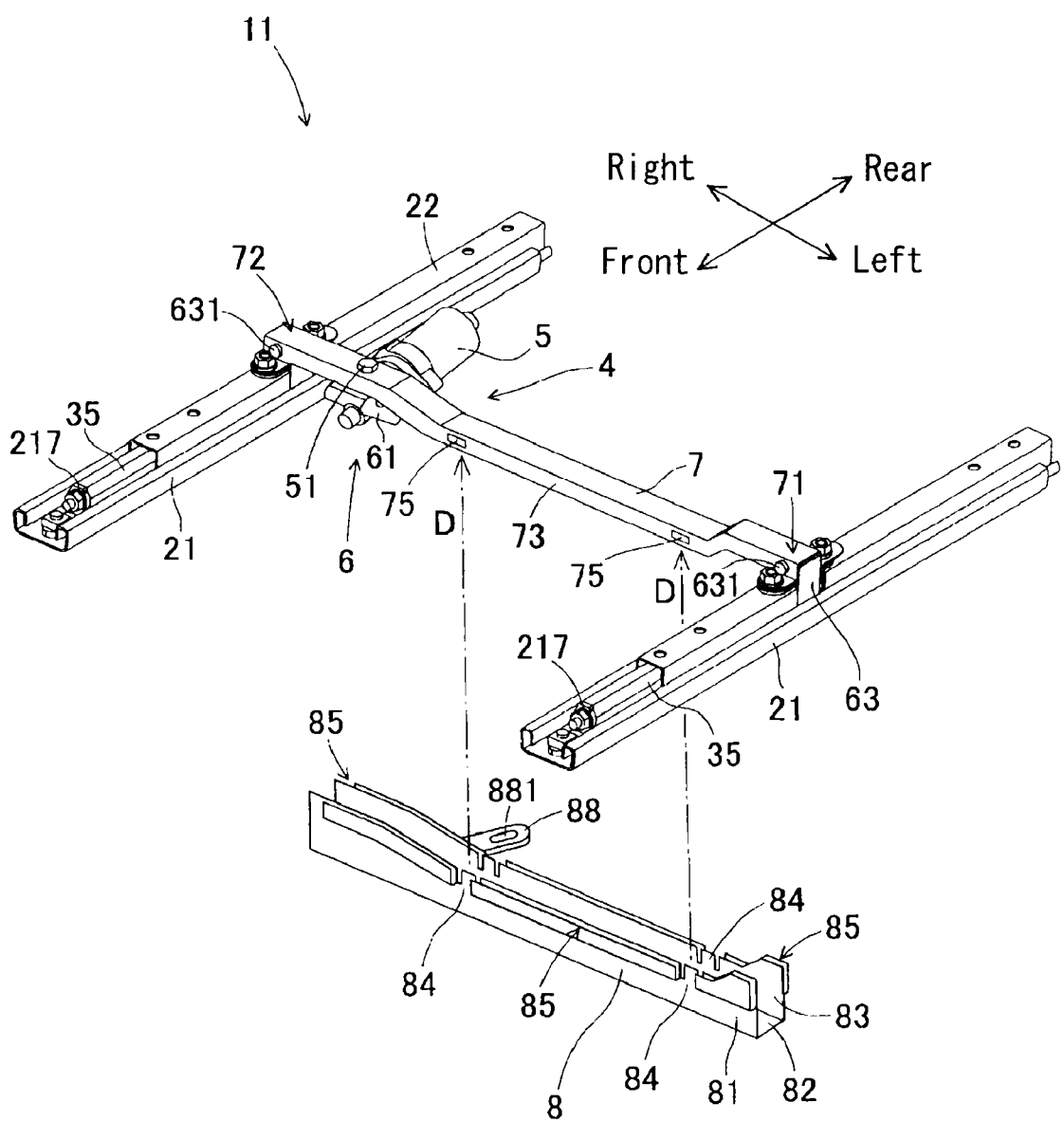
FIG. 5 is a perspective view of detailed constructions of a seat sliding apparatus for a vehicle, which shows a state where a protection cover is unassembled, according to a second embodiment of the present invention.

A second embodiment of a sliding apparatus in which a rotatable nut member is provided on the upper rail will be explained primarily with reference to FIG. 5. Structures of the second embodiment different from the first embodiment will be explained hereinafter and explanations for the structures common to the first embodiment will not be repeated. FIG. 5 shows an explanatory perspective view showing a state where a protection cover of the sliding apparatus for the vehicle seat is removed. According to the second embodiment, a sliding apparatus 11 includes the lower rail 21, the upper rail 22, unrotatable screw shafts (first and second screw shafts) 35, rotatable nut members, and a slide drive portion 4. The structures of the lower rail 21 and the upper rail 22 are common to the configurations of the lower rail 21 and the upper rail 22 of the first embodiment.

The screw shaft 35 formed by a long member on which a male screw is threaded is positioned inside each of the lower rails 21, 21 so that the screw shafts 35, 35 are in parallel to each other. A front end and a rear end of each of the screw shafts 35 are fixed to the lower rail 21 by means of a fixing bracket 217 so as not to be rotatable. The fixing bracket 217 includes a fixing hole at a first end thereof and a fixing nut at a second end thereof. The fixing bracket 217 is bent at a center portion. A screw portion of an end of the screw shaft 35 is positioned in the fixing hole and is fixed to the fixing bracket 217 by means of a nut via threaded portions. And a fixing bolt positioned through a fixing hole formed on a bottom surface of the lower rail 21 is fixed to the fixing nut of the fixing bracket 217 via threaded portions.

The nut member is formed by a member on which a female screw which engages with the screw shaft 35 is threaded. The nut member is rotatably positioned in a direction changing reduction gear portion 63 provided on each of the upper rails 22, 22.

The slide drive portion 4 includes a drive motor 5, a transmission mechanism 6, a long bracket 7, and a protection cover 8.

The long bracket 7 is formed with a substantially rectangular shaped member whose longitudinal side is arranged in a right-left direction of the vehicle. A first end (left end) 71 and a second end (right end) 72 of the long bracket 7 are positioned on the top surface of the upper rails 22, 22 respectively. In other words, the long bracket 7 is provided to connect the upper rails 22, 22 arranged laterally spaced from each other on the right and left sides. A front end and a rear end of the long bracket 7 are bent in a downward direction to form side flanges, 73, 74, respectively. That is, likewise as shown in FIG. 4, the long bracket 7 is formed to have a shallow inverted U-shape in a longitudinal cross-section where a bottom side of the long bracket 7 is open. Engagement hole portions 75, 75 are formed on each of the side flanges 73, 74 at portions closer to the left end and the right end relative to the center, respectively. Thus, four engagement hole portions in total are provided on the long bracket 7.

The drive motor 5 is positioned on a bottom-rear side of the long bracket 7 at a portion closer to the right-hand end of the long bracket 7. A reduction gear portion 61 retains the drive motor 5. The transmission mechanism 6 which transmits the driving force from the drive motor 5 to each of the screw shafts 35, 35 includes the reduction gear portion 61, a connecting shaft 62, and the direction changing reduction gear portion 63. The driving force from the drive motor 5 is transmitted to the screw shafts 35, 35 via the reduction gear portion 61, a connecting shaft 62, and the direction changing reduction gear portion 63 in the above-mentioned order. The reduction gear portion 61 is fixed to a bottom side of the long bracket 7 by means of a fixing bolt 51 and retains the drive motor 5 at a rear side thereof. An output shaft of the drive motor 5 is connected to the reduction gear portion 61, and the driving force of the drive motor 5 is decelerated by means of a built-in worm gear mechanism and the decelerated driving force is outputted to the connecting shaft 62. The connecting shaft 62 is retained penetrating through the reduction gear portion 61 so that an axis of the connecting shaft 62 extends in the right-left direction. The connecting shaft 62 is a shaft member having, for example, a hexagonal shape in cross-section and a length which approximately reaches the upper rails 22, 22 laterally spaced away from each other. Further, the connecting shaft 62 is configured to distribute the decelerated driving force eventually to each of the screw shafts 35, 35. The direction changing reduction gear portion 63 is provided at a center of each of the upper rails 22 slightly to the front in a longitudinal direction, and the connecting shaft 62 is connected to the direction changing reduction gear portion 63. The direction changing reduction gear portion 63 rotatably retains the nut member. The direction changing reduction gear portion 63 is configured to decelerate the driving force of the connecting shaft 62 by means of a built-in gear mechanism and to rotationally drive the nut member by changing directions to transmit the driving force by ninety degrees. The first end 71 and the second end 72 of the long bracket 7 and the direction changing reduction gear portions 63, 63 are fixed to the upper rails 22, 22 by means of corresponding screws 631, respectively.

The protection cover 8 is formed to have a longer length in the right-left direction and a shorter width in a front-rear direction. The protection cover 8 is positioned under the long bracket 7 to cover a front portion of the drive motor 5 and the transmission mechanism 6. Likewise the protection cover 8 of the first embodiment shown in FIG. 4, the protection cover 8 according to the second embodiment is formed to have a U-shape in a cross-section where an upper side of the protection cover 8 is open, and includes a front wall 81, a bottom wall 82, and a rear wall 83 which are integrally formed. The bottom wall 82 is formed and arranged substantially horizontally.

Constructions of engaging detent portions 84 (e.g., four engaging detect portions) formed on the front wall 81 and the rear wall 83 of the protection cover 8, a guide portion 85, and a harness retaining portion 88 are common to those of the first embodiment as shown in FIGS. 2 and 3.

Further, as indicated with arrowed dotted lines D, D in FIG. 5, when assembling the protection cover 8, the protection cover 8 is attached from underneath of the long bracket 7. Because of the afore-mentioned construction, an appearance is ameliorated, and the reduction gear portion 61, the connecting shaft 62, and edge portions of the side flanges 73, 74 are blocked from the outside by the protection cover 8. Further, a harness retaining portion 88 including a retaining hole 881 is formed on the protection cover 8 as described in the first embodiment. For example, a wire harness which includes a bundle of power lines of the drive motor 5, or the like, is retained to the retaining hole 881 or, for example, a connector which connects a power line, or the like, to a subject, is fixed to the retaining hole 881. Thus, the sliding apparatus for the vehicle according to the second embodiment exhibits the effects. Advantages similar to those of the first embodiment and the explanations will not be repeated.

According to the embodiments, when one of the screw shaft 31, 35 and the nut member 32 is rotated by a driving force of the slide drive portion 4 to displace in the axial direction of the screw shaft 31, 35 relative to the other of the nut member 32 and the screw shaft 31, 35, the upper rails 22 slides on the lower rails 21 in the front-rear direction, thus to adjust the position of the vehicle seat 92 in the front-rear direction. In those circumstances, at least the front side and bottom side of the drive motor 5 and the transmission mechanism 6 which are supported by the long bracket 7 of the slide drive portion 4 are covered by the protection cover 8. Accordingly, when viewing the vehicle seat 92 from the front or bottom-front direction, the drive motor 5 and the transmission mechanism 6 are not seen, and an external surface of the protection cover 8 is seen, which ameliorates an appearance. Further, because the protection cover 8 blocks the drive motor 5 and the transmission mechanism 6 having movable portions from the outside, even if an occupant puts his/her hand under the vehicle seat 92, his/her hand does not reach the drive motor 5 and the transmission mechanism 6.

According to the embodiments of the seat sliding apparatus for the vehicle, the protection cover 8 configured to have an approximately U-shape cross-section covers the transmission mechanism 6 from a lower side between the upper rails 22, 22, and houses an edge portion of a flange of the bracket 7.

According to the embodiments, the bottom side, the front side, and the rear side of the transmission mechanism 6 is covered by the protection cover 8 between the upper rails 22, and the top side of the transmission mechanism 6 is covered by the long bracket 7. Accordingly, transmission mechanism 6 cannot be seen or reached except from lateral sides. Further, the edge portions of the side flanges 73, 74 of the long bracket 7 are housed in the protection cover 8. Accordingly, the appearance is further ameliorated and the transmission mechanism 6 and the edge portions are securely blocked from the outside.

According to the embodiments of the seat sliding apparatus for the vehicle, the long bracket 7 includes an engagement hole portion 75 on a periphery portion thereof for detachably retaining the protection cover 8, and the protection cover includes an engaging detent portion 84 which is configured to fit into the engagement hole portion 75.

According to the constructions of the embodiments, the protection cover 8 can be assembled with a simple operation, that is, by fitting the engaging detent portion 84 of the protection cover 8 into the engagement hole portion 75 provided on a peripheral portion of the long bracket 7. Further, with a simple operation, that is, by disengaging the engaging detent portion 84 of the protection cover 8 from the engagement hole portion 75, the protection cover 8 can be removed. Accordingly, the operability for assembling the protection cover 8 increases and contributes to reducing a manufacturing cost.

According to the embodiments of the seat sliding apparatus for the vehicle, the protection cover 8 includes a harness retaining portion 88 which retains a wire harness or a connector.

According to the constructions of the embodiments, a wire harness or a connector can be retained onto the harness retaining portion 88 provided on the protection cover 8. Thus, a bracket particularly for retaining the wire harness or the connector is not needed. Accordingly, the structure provided under the vehicle seat 92 is simplified, and a time required for assembling the bracket and an increase in the number of parts can be restrained, which contributes to reduce the manufacturing cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat sliding apparatus for a vehicle, comprising:
   first and second lower rails extending in a front-rear direction which are laterally spaced and adapted to be fixed to a vehicle floor;
   first and second upper rails extending in the front-rear direction which are laterally spaced and adapted to support a seat, the first and second upper rails being slidably supported by the first and second lower rails, respectively;
   a first screw mechanism provided between the first upper rail and the first lower rail, the first screw mechanism including a first screw shaft and a first nut which is screwed on the first screw shaft, one of the first screw shaft and the first nut being rotatably mounted to the first upper rail, the other of the first screw shaft and the first nut being fixedly mounted to the first lower rail;
   a second screw mechanism provided between the second upper rail and the second lower rail, the second screw mechanism including a second screw shaft and a second nut which is screwed on the second screw shaft, one of the second screw shaft and the second nut being rotatably mounted to the second upper rail, the other of the second screw shaft and the second nut being fixedly mounted to the second lower rail; and
   a slide driving mechanism including (a) a driving motor, (b) a transmission mechanism for transmitting a rotational force outputted from the driving motor to one of the first screw shaft and the first nut being mounted to the first upper rail so as to rotate and to one of the second screw shaft and the second nut being mounted to the second upper rail so as to rotate, (c) a bracket extending in a left-right direction perpendicular to the front-rear direction, the bracket having the driving motor and the transmission mechanism mounted thereon and connecting the first and second upper rails, and (d) a protection cover means for covering at least front and bottom sides of the driving motor and the transmission mechanism
   wherein the bracket includes a first end positioned on a top surface of the first upper rail, a second end positioned on a top surface of the second upper rail, front and rear side flanges formed by bending a front end and a rear end of the bracket in a downward direction, and engagement hole portions formed on each of the side flanges, the bracket presenting an inverted U-shape in cross-section where a bottom side of the bracket is open, wherein the protection cover includes a front wall, a rear wall, a bottom wall, engaging detent portions provided on an upper rim of the front wall and an upper rim of the rear wall that include an engagement projection being provided on an outer side each of the engaging detent portions, and guide portions which include guide members with a first portion which is parallel to the bottom wall and a second portion which is parallel to the front and rear walls, the protection cover presenting a U-shaped cross-section where an upper side of the protection cover is open, wherein the engagement projection of the protection cover is fitted into a corresponding engagement hole portion of the bracket to attach the protection cover to the bracket, and wherein the side flanges of the bracket are sandwiched by the guide members and one of the front or rear walls of the protective cover.

2. A seat sliding apparatus for a vehicle, comprising:
first and second lower rails laterally spaced and adapted to be fixed to a vehicle floor;
first and second upper rails laterally spaced and adapted to support a seat, the first and second upper rails being slidably supported by the first and second lower rails, respectively;
a first screw mechanism provided between the first upper rail and the first lower rail, the first screw mechanism including a first screw shaft and a first nut which is screwed on the first screw shaft, one of the first screw shaft and the first nut being rotatably mounted to the first upper rail, the other of the first screw shaft and the first nut being fixedly mounted to the first lower rail;
a second screw mechanism provided between the second upper rail and the second lower rail, the second screw mechanism including a second screw shaft and a second nut which is screwed on the second screw shaft, one of the second screw shaft and the second nut being rotatably mounted to the second upper rail, the other of the second screw shaft and the second nut being fixedly mounted to the second lower rail; and
a slide driving mechanism including (a) a driving motor, (b) a transmission mechanism for transmitting a rotational force outputted from the driving motor to one of the first screw shaft and the first nut being mounted to the first upper rail so as to rotate and to one of the second screw shaft and the second nut being mounted to the second upper rail so as to rotate, (c) a bracket having the driving motor and the transmission mechanism mounted thereon and connecting the first and second upper rails, and (d) a protection cover attached to the bracket for covering at least front and bottom sides of the transmission mechanism,
wherein the bracket is positioned at a top side of the transmission mechanism to cover the top side of the transmission mechanism, and
wherein the protection cover covers the transmission mechanism in cooperation with the bracket.

3. The seat sliding apparatus for the vehicle according to claim 2, wherein the bracket includes a first end positioned on the first upper rail, a second end positioned on a top surface of the second upper rail, front and rear side flanges formed by bending a front end and a rear end of the bracket in a downward direction, and
wherein the protection cover includes a front wall, a rear wall and a bottom wall.

4. The seat sliding apparatus for the vehicle according to claim 3, wherein the bracket includes engagement hole portions formed on each of the side flanges,
wherein the protection cover includes engaging detent portions provided on an upper rim of the front wall and an upper rim of the rear wall, and an engagement projection being provided on an outer side of each of the engaging detent portions, and
wherein the engagement projection of the protection cover is fitted into a corresponding engagement hole portion of the bracket to attach the projection cover to the bracket.

5. The seat sliding apparatus for the vehicle according to claim 2, wherein the protection cover includes a harness retaining portion which retains a wire harness or a connector.

6. The seat sliding apparatus for the vehicle according to claim 2, wherein the bracket comprises a long three-sided rectangular channel.

7. The seat sliding apparatus for the vehicle according to claim 2, wherein the protection cover is formed of resin.

8. The seat sliding apparatus for the vehicle according to claim 2, wherein the bracket comprises a long three-sided rectangular channel and the protection cover is formed of resin.

9. The seat sliding apparatus for the vehicle according to claim 2, wherein the protection cover is attached to the bracket for covering at least front and bottom sides of a part of the driving motor.

10. The seat sliding apparatus for the vehicle according to claim 3, wherein the protection cover covers the transmission mechanism from a lower side between the upper rails, and houses an edge portion of the side flanges of the bracket.

11. A seat sliding apparatus for a vehicle, comprising:
first and second lower rails extending in a front-rear direction which are laterally spaced and adapted to be fixed to a vehicle floor;
first and second upper rails extending in the front-rear direction which are laterally spaced and adapted to support a seat, the first and second upper rails being slidably supported by the first and second lower rails, respectively;
a first screw mechanism provided between the first upper rail and the first lower rail, the first screw mechanism including a first screw shaft and a first nut which is screwed on the first screw shaft, one of the first screw shaft and the first nut being rotatably mounted to the first upper rail, the other of the first screw shaft and the first nut being fixedly mounted to the first lower rail;
a second screw mechanism provided between the second upper rail and the second lower rail, the second screw mechanism including a second screw shaft and a second nut which is screwed on the second screw shaft, one of the second screw shaft and the second nut being rotatably mounted to the second upper rail, the other of the second screw shaft and the second nut being fixedly mounted to the second lower rail; and
a slide driving mechanism including (a) a driving motor, (b) a transmission mechanism for transmitting a rotational force outputted from the driving motor to one of the first screw shaft and the first nut being mounted to the first upper rail so as to rotate and to one of the second screw shaft and the second nut being mounted to the second upper rail so as to rotate, (c) a bracket extending in a left-right direction perpendicular to the front-rear direction, the bracket having the driving motor and the transmission mechanism mounted thereon and connecting the first and second upper rails, and (d) a protection cover attached to the bracket for covering at least front and bottom sides of the driving motor and the transmission mechanism, wherein the bracket includes a first end positioned on a top surface of the first upper rail, a second end positioned on a top surface of the second upper rail, front and rear side flanges formed by bending a front end and a rear end of the bracket in a downward direction, and engagement hole portions formed on each of the side flanges, the bracket presenting an inverted U-shape in cross-section where a bottom side of the bracket is open, wherein the protection cover includes a front wall, a rear wall, a bottom wall, and engaging detent portions provided on an upper rim of the front wall and an upper rim of the rear wall, an engagement projection being provided on an outer side each of the engaging detent portions, and the protection cover presenting a U-shaped cross-section where an upper side of the protection cover is open, and wherein the engagement projection of the protection cover is fitted into a corresponding engagement hole portion of the bracket to attach the protection cover to the bracket.

12. The seat sliding apparatus for the vehicle according to claim 11, wherein a depth of the U-shaped cross section of the protective cover is shallower at a center of the protective cover in the left-direction than at end portions of the protective cover.

13. The seat sliding apparatus for the vehicle according to claim 11, wherein a portion of the rear wall close to the driving motor is partially recessed.

14. The seat sliding apparatus for the vehicle according to claim 11, wherein a portion of the front wall close to the transmission mechanism is partially recessed.

15. The seat sliding apparatus for the vehicle according to claim 11, wherein a length of the bracket in the left-right direction is greater than a length of the protective cover in the left-right direction.

* * * * *